(12) United States Patent
Kawasaki et al.

(10) Patent No.: US 10,137,535 B2
(45) Date of Patent: *Nov. 27, 2018

(54) CU BALL, CU CORE BALL, SOLDER JOINT, SOLDER PASTE, AND SOLDER FOAM

(71) Applicant: Senju Metal Industry Co., Ltd., Tokyo (JP)

(72) Inventors: Hiroyoshi Kawasaki, Tochigi (JP); Takahiro Roppongi, Tochigi (JP); Daisuke Soma, Tochigi (JP); Isamu Sato, Saitama (JP)

(73) Assignee: Senju Metal Industry Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/116,271

(22) PCT Filed: Feb. 4, 2014

(86) PCT No.: PCT/JP2014/052569
§ 371 (c)(1),
(2) Date: Dec. 7, 2016

(87) PCT Pub. No.: WO2015/118611
PCT Pub. Date: Aug. 13, 2015

(65) Prior Publication Data
US 2017/0246711 A1 Aug. 31, 2017

(51) Int. Cl.
*B23K 35/02* (2006.01)
*B22F 1/02* (2006.01)
(Continued)

(52) U.S. Cl.
CPC ........ *B23K 35/0244* (2013.01); *B22F 1/0048* (2013.01); *B22F 1/02* (2013.01);
(Continued)

(58) Field of Classification Search
CPC ...... B23K 35/302; B23K 35/0244; B22F 1/02
(Continued)

(56) References Cited

U.S. PATENT DOCUMENTS 6,290,746 B1 9/2001 Yamamoto
9,278,409 B2 * 3/2016 Kawasaki ............... C22C 12/00
(Continued)

FOREIGN PATENT DOCUMENTS

CN 103415633 A 11/2013
JP 6199646 A 5/1986
(Continued)

*Primary Examiner* — Weiping Zhu
(74) *Attorney, Agent, or Firm* — The Webb Law Firm

(57) ABSTRACT

Provided are a Cu ball, a Cu core ball, a solder joint, solder paste and foamed solder, which are superior in the impact resistance to dropping and can inhibit any occurrence of poor joints a junction defect. An electronic component 60 is constructed by joining a solder bump 30 of a semiconductor chip 10 to an electrode 41 of a printed circuit board 40 with solder paste 12, 42. The solder bump 30 is formed by joining an electrode 11 of the semiconductor chip 10 to the Cu ball 20. The Cu ball 20 according to the present invention contains purity which is equal to or higher than 99.9% and equal to or lower than 99.995%, sphericity which is equal to or higher than 0.95, and Vickers hardness which is equal to or higher than 20 HV and equal to or less than 60 HV.

16 Claims, 2 Drawing Sheets

(51) Int. Cl.
- *B23K 35/22* (2006.01)
- *C25D 7/00* (2006.01)
- *C22C 9/00* (2006.01)
- *C22F 1/00* (2006.01)
- *C22F 1/08* (2006.01)
- *B23K 35/30* (2006.01)
- *B22F 1/00* (2006.01)
- *C22C 9/02* (2006.01)
- *C22C 1/04* (2006.01)

(52) U.S. Cl.
CPC ............ *B22F 1/025* (2013.01); *B23K 35/025* (2013.01); *B23K 35/22* (2013.01); *B23K 35/302* (2013.01); *C22C 1/0425* (2013.01); *C22C 9/00* (2013.01); *C22C 9/02* (2013.01); *C22F 1/00* (2013.01); *C22F 1/08* (2013.01); *C25D 7/00* (2013.01)

(58) Field of Classification Search
USPC .......................................................... 148/24
See application file for complete search history.

(56) References Cited

U.S. PATENT DOCUMENTS

| | | |
|---|---|---|
| 2013/0025917 A1 | 1/2013 | Chiba et al. |
| 2013/0028786 A1 | 1/2013 | Kanou |
| 2014/0010705 A1* | 1/2014 | Kanou ............... C25C 1/12 420/491 |

FOREIGN PATENT DOCUMENTS

| | | | |
|---|---|---|---|
| JP | 2003249598 A | | 9/2003 |
| JP | 20052428 A | | 1/2005 |
| JP | 2005002428 A | * | 1/2005 |
| JP | 2007115857 A | | 5/2007 |
| JP | 2010242158 A | | 10/2010 |
| JP | 201129395 A | | 2/2011 |
| JP | 2011029395 A | * | 2/2011 |
| JP | 2011176124 A | | 9/2011 |
| JP | 5408401 B1 | | 2/2014 |
| JP | 5435182 B1 | | 3/2014 |
| WO | 9524113 A1 | | 9/1995 |
| WO | 2011114824 A1 | | 9/2011 |
| WO | 2011118009 A1 | | 9/2011 |
| WO | 2012120982 A1 | | 9/2012 |

* cited by examiner

[FIG. 1]
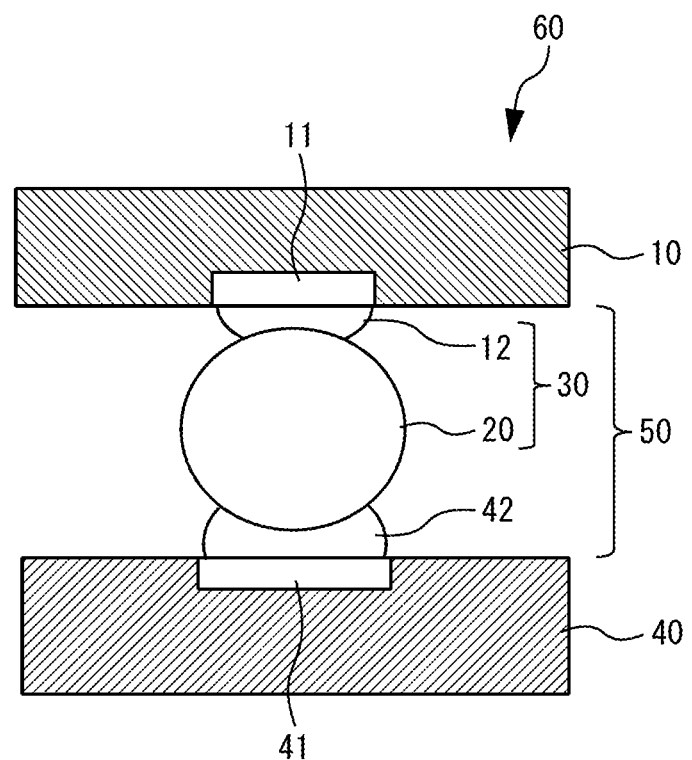

[FIG. 2]
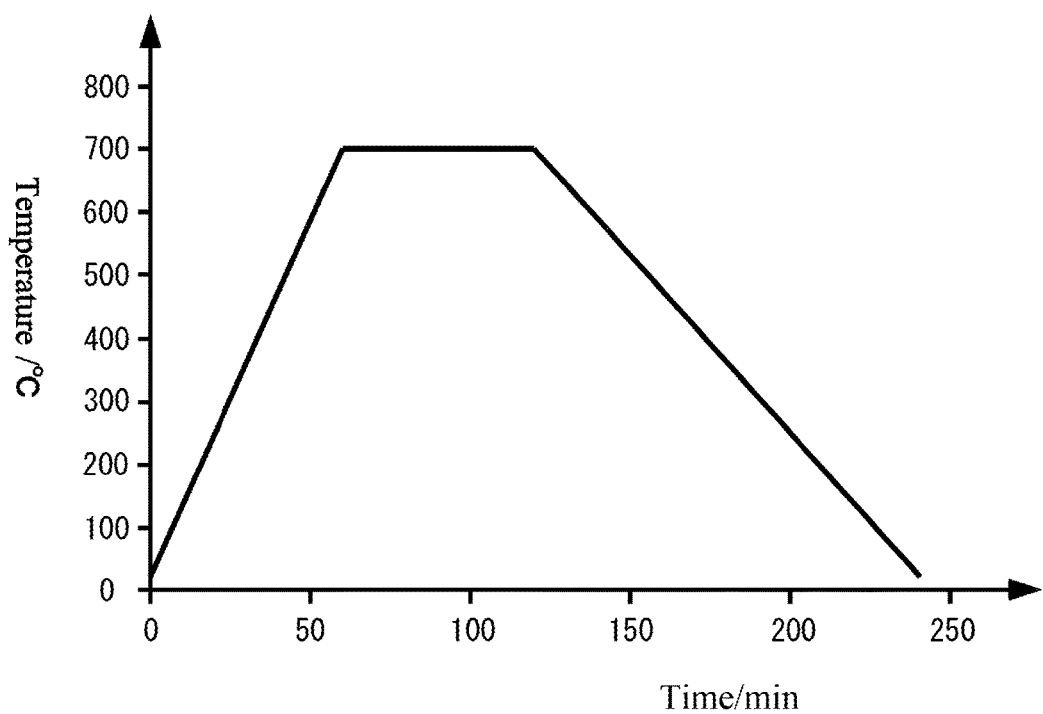

CU BALL, CU CORE BALL, SOLDER JOINT, SOLDER PASTE, AND SOLDER FOAM

CROSS-REFERENCE TO RELATED APPLICATION

This application is the United States national phase of International Application No. PCT/JP2014/052569 filed Feb. 4, 2014, the disclosure of which is hereby incorporated in its entirety by reference.

TECHNICAL FIELD

The present invention relates to a Cu ball, a Cu core ball, a solder joint, solder paste and foamed solder.

BACKGROUND

Recently, along development of compact information equipment, electronic components to be mounted have been downsized rapidly. A ball grid alley (hereinafter referred to as "BGA") having electrodes at its rear surface is applied to such electronic components in order to cope with a narrowed connection terminal and a reduced mounting area because of the downsizing requirement.

As the electronic components to which the BGA is applied, for example, a semiconductor package is exemplified. In the semiconductor package, semiconductor chips having electrodes are sealed with resin. Solder bumps are formed on the electrodes of the semiconductor chips. This solder bump is formed by joining a solder ball to an electrode of the semiconductor chip. The semiconductor package to which the BGA is applied is mounted on a printed circuit board by joining the solder bump melted by the heating to a conductive land of the printed circuit board. Additionally, a three-dimensional high-density mounting structure has been studied by stacking up the semiconductor packages in a height direction in order to meet the further high-density mounting requirement.

However, in a case that the BGA is applied to the semiconductor package for the three-dimensional high-density mounting structure, the solder ball may be crushed by semiconductor package's weight. If such an accident happens, an appropriate space between the substrates cannot be maintained.

Accordingly, a solder bump has been considered, where a Cu ball or a Cu core ball in which solder plating is covered on a surface of the Cu ball, is electrically joined on an electrode of an electronic component by using solder paste. The solder bump formed by using the Cu ball or the Cu core ball can support a semiconductor package by the Cu ball, which is not melted at a melting temperature of the solder, even if the solder bump receives the weight of the semiconductor package when the electronic components are mounted on the printed circuit board. Therefore, the solder bump is not crushed by the semiconductor package's weight. As related art, for example, Patent Document 1 is exemplified.

A Cu ball is formed by melting a small piece of Cu material with the heating to make it a ball. Patent Document 2 discloses a method of forming a Cu ball by spherically coagulating Cu metal powder after it is cast into thermal plasma and melted. It is common for the Cu balls formed by such methods to be cooled rapidly to room temperature or cooling gas temperature, in terms of expediting an amount of production or a production rate.

PRIOR ART DOCUMENTS

Patent Documents

Patent Document 1: International Patent Publication No. 95/24113
Patent Document 2: Japanese Patent Application Publication No. 2005-2428

SUMMARY OF THE INVENTION

Problems to be Solved by the Invention

However, as mentioned above, in a case of manufacturing the Cu ball by the rapid-cooling, a crystal grain of Cu is formed instantly, so that the Cu ball is formed by a fine crystal grain before the crystal grain grows bigger. Because the Cu ball formed by the fine crystal grain is hard and high in the Vickers hardness, the durability against external stress becomes low and the problem that the impact resistance to dropping gets worse occurs. Therefore, for the Cu ball used for implementing a semiconductor chip, any definite softness is required, that is the Vickers hardness that is equal to a prescribed value or less is required.

In order to manufacture the Cu ball having such definite softness, the purity of Cu is increased as a usual practice. This is because a crystal grain grows bigger when the impurity elements which function as a crystal core inside the Cu ball decrease and as the result, the Vickers hardness of the Cu ball becomes lower. However, in a case that the purity of Cu ball is increased, a problem which sphericity of the Cu ball becomes lower occurs instead of enabling the Vickers hardness of the Cu ball to be lower.

In a case that the sphericity of Cu ball is low, there is a possibility that self-aligning property cannot be ensured when mounting the Cu balls on the electrodes, and simultaneously there is a possibility that poor joints are produced due to uneven heights of the Cu balls at the time of mounting a semiconductor chip. In the above-mentioned Patent Document 1, the method of manufacturing the Cu ball is disclosed, however, there is not any description of the Cu ball in which the properties of both the Vickers hardness and the sphericity are considered.

Accordingly, in order to solve the above-described problems, the present invention has a purpose to provide a Cu ball, a Cu core ball, a solder joint, solder paste and foamed solder, which are superior in the impact resistance to dropping and can inhibit any occurrence of poor joints or the like.

Means for Solving the Problems

The inventors of the present invention have conducted a selection of the Cu ball. They have found out that the Cu ball, which is preferable for the solution of problems in the present invention, could be obtained when the Vickers hardness of the Cu ball is equal to or higher than 20 HV and equal to or less than 60 HV. Moreover, it has been found that Cu balls having Vickers hardness ranged from equal to or higher than 20 HV to equal to or less than 60 HV could be obtained efficiently by expediting crystal growth in each of the Cu balls and therefore, mass production could be realized. Furthermore, in the present invention, a case of utilizing 'an annealing treatment' will be described as means for expediting the crystal growth of each of the Cu balls. However, the annealing treatment is not always a necessary step and the crystal growth of each of the Cu balls can be expedited by utilizing other means.

Here, the present invention is described as follows.

(1) A Cu ball containing purity which is equal to or higher than 99.9% and equal to or lower than 99.995%, sphericity which is equal to or higher than 0.95, and Vickers hardness which is equal to or higher than 20 HV and equal to or less than 60 HV.

(2) The Cu ball according to the above-mentioned item (1), wherein a content of U is equal to or less than 5 ppb, a content of Th is equal to or less than 5 ppb, a total content of at least one of Pb and Bi is equal to or more than 1 ppm, and an alpha dose is equal to or less than 0.0200 cph/cm$^2$.

(3) The Cu ball according to the above-mentioned item (1) or (2), wherein a diameter thereof is 1-1000 μm.

(4) The Cu ball according to any one of the above-mentioned items (1) through (3) wherein the Cu ball is coated with a flux layer.

(5) A Cu core ball containing the Cu ball according to any one of the above-mentioned items (1) through (3) and a solder layer coating the Cu ball.

(6) A Cu core ball containing the Cu ball according to any one of the above-mentioned items (1) through (3) and a plating layer which includes at least one element selected from a group of Ni, Fe and Co, the plating layer coating the Cu ball.

(7) The Cu core ball according to the above-mentioned item (6), further comprises a solder layer which coats the plating layer.

(8) The Cu core ball according to any one of the above-mentioned items (5) through (7) wherein sphericity thereof is equal to or higher than 0.95.

(9) The Cu core ball according to any one of the above-mentioned items (5) through (7), wherein in the solder layer coating the plating layer, a content of U is equal to or less than 5 ppb; a content of Th is equal to or less than 5 ppb; a total content of at least one of Pb and Bi is equal to or more than 1 ppm; and an alpha dose is equal to or less than 0.0200 cph/cm2.

(10) The Cu core ball according to any one of the above-mentioned items (5) through (9) wherein the Cu core ball is coated with a flux layer.

(11) A solder joint using the Cu ball according to any one of the above-mentioned items (1) through (4).

(12) Solder paste using the Cu ball according to any one of the above-mentioned items (1) through (4).

(13) Foamed solder using the Cu ball according to any one of the above-mentioned items (1) through (4).

(14) A solder joint using the Cu core ball according to any one of the above-mentioned items (5) through (10).

(15) Solder paste using the Cu core ball according to any one of the above-mentioned items (5) through (10).

(16) Foamed solder using the Cu core ball according to any one of the above-mentioned items (5) through (10).

Effects of the Invention

According to the present invention, since the Vickers hardness of the Cu ball is set to be equal to or higher than 20 HV and equal to or lower than 60 HV, it is possible to improve the impact resistance to dropping and simultaneously, it is possible to maintain an appropriate space between the substrates. Additionally, since the sphericity of the Cu ball is set to be equal to or higher than 0.95, it is possible to ensure the self-alignment property when mounting the Cu balls on the electrodes, and simultaneously, it is possible to inhibit uneven heights of the Cu balls.

BRIEF DESCRIPTION OF THE DRAWINGS

FIG. 1 is a diagram of an electronic component using a Cu ball according to the prevent invention for illustrating a configuration example thereof.

FIG. 2 is a diagram showing a relationship between temperature and time at the time of annealing.

EMBODIMENTS FOR CARRYING OUT THE INVENTION

The present invention will be described in detail hereinafter. In this specification, units (such as ppm, ppb and %) relating to composition of the Cu ball represent ratios to mass of the Cu ball (mass ppm, mass ppb and mass %) unless otherwise specified.

FIG. 1 shows a configuration example of an electronic component 60 in which a semiconductor chip 10 is mounted on a printed circuit board 40 using a Cu ball 20 according to the prevent invention. As shown in FIG. 1, the Cu ball 20 is mounted on an electrode 11 of the semiconductor chip 10 via solder paste 12. In this example, a structure in which the Cu ball 20 is mounted on the electrode 11 of the semiconductor chip 10 is called a solder bump 30. Solder paste 42 is printed on an electrode 41 of the printed circuit board 40. The solder bump 30 of the semiconductor chip 10 is connected on the electrode 41 of the printed circuit board 40 via the solder paste 42. In this embodiment, a structure in which the solder bump 30 is mounted on the electrode 41 of the printed circuit board 40 is called a solder joint 50.

The Cu ball 20 according to the present invention is characterized in that its purity is equal to or higher than 99.9% and equal to or lower than 99.995%, its sphericity is equal to or higher than 0.95, and its Vickers hardness is equal to or higher than 20 HV and equal to or less than 60 HV. In this way, impact resistance to dropping can be improved by setting the Vickers hardness of the Cu ball to be equal to or less than 60 HV, and an appropriate space between the substrates can be maintained by setting the Vickers hardness of the Cu ball to be equal to or higher than 20 HV. Additionally, by setting the sphericity of the Cu ball 20 to be equal to or higher than 0.95, the self-alignment property can be ensured when mounting the Cu balls 20 on the electrodes 11 of the semiconductor chip 10, and simultaneously, uneven heights of the solder joints 50 can be inhibited because the Cu ball 20 is not melted at a melting temperature in the soldering. In this way, the poor joints of the semiconductor chip 10 and the printed circuit board 40 can be securely prevented. A preferred embodiment of the Cu ball 20 will be described hereinafter.

<The Vickers Hardness: Equal to or Higher than 20 HV and Equal to or Less than 60 HV>

The Vickers hardness of the Cu ball according to the present invention is preferably equal to or less than 60 HV. This is because the durability against external stress becomes low, the impact resistance to dropping gets worse, and cracks are generated easily, in a case that the Vickers hardness exceeds 60 HV. This is also because, in a case that the auxiliary force such as pressurization is applied when forming three-dimensional mounting bumps and joints, there is a possibility that a crash of electrode and the like may occur with the use of a hard Cu ball. Moreover, this is because, in a case that the Vickers hardness of Cu ball 20 exceeds 60 HV, a crystal grain becomes smaller than a certain size and therefore, a deterioration of electrical conductivity may be caused. In the present embodiment, after manufacturing the Cu ball by productive rapid-cooling, the crystal growth is expedited in the manufactured Cu ball 20, and therefore the Cu ball 20 whose Vickers hardness is equal to or less than 60 HV is manufactured. As means for expediting the crystal growth in the Cu ball 20, for example, it is exemplified that a step for slow-cooling, not the conventional rapid-cooling, at the time of making the Cu ball 20, is set, except the annealing treatment. When an apparatus of drip type is used as a manufacturing apparatus of the Cu balls 20, an extremely high tower is needed for the slow-cooling, which lacks feasibility. However, if a method for manufacturing them by a heating furnace type is used, it is possible to cope with the slow-cooling by adding a slow-cooling process that makes a cooling speed slower or sets a conveying distance longer.

Moreover, the Vickers hardness of the Cu ball according to the present invention needs to be at least a value larger than 10-20 HV of the Vickers hardness of the solder ball, and preferably 20 HV or more. When the Vickers hardness of the Cu ball is less than 20 HV, the Cu ball becomes deformed (crashed) due to its own weight of the semiconductor chips or the like in the three-dimensional mounting, so that it is impossible to maintain an appropriate space between the substrates (stand-off height). Additionally, because no plating step is required like Cu pillar and the like, a pitch narrowing for the electrode 41 and the like can be realized by setting the Vickers hardness of the Cu ball 20 at 20 HV and more.

<Content of U: Equal to or Less than 5 Ppb, and Content of Th: Equal to or Less than 5 Ppb>

U and Th are radioactive elements and it is required to reduce the content of these elements in order to suppress a soft error. The content of each U and Th should be equal to or less than 5 ppb in order to make an alpha dose of the Cu ball 20 equal to or less than 0.0200 cph/cm$^2$. In addition, from a viewpoint of the suppression of the soft error for the current or future high-density mounting, the content of each U and Th should be equal to or less than 2 ppb.

<Purity in Cu Ball: Equal to or Higher than 99.9% and Equal to or Lower than 99.995%>

It is preferable that purity in the Cu ball 20 constituting the present invention is equal to or higher than 99.9% and equal to or lower than 99.995%. If the purity in the Cu ball 20 is within this range, a sufficient volume of crystal cores for increasing the sphericity of the Cu ball 20 can be kept in molten Cu. The following will describe a reason why sphericity is increased hereinafter.

When manufacturing the Cu ball 20, the Cu material is formed into a predetermined shaped chip and is melted by heating. The molten Cu then becomes a spherical form with its surface tension. It is solidified to become the Cu ball 20. At a process of solidifying the molten Cu from its liquid state, a crystal grain grows up in the molten Cu of the spherical form. In this process, if there are a lot of impurity elements, they become the crystal cores and prevent the crystal grain from growing. Accordingly, the molten Cu of the spherical form becomes the Cu ball 20 having the high sphericity with the fine crystal grains that is prevented from growing up. On the other hand, if the number of impurity elements is less, then the crystal cores are relatively less formed. They grow up in a directional property without suppressing the grain growth. As a result, a part of the surface of the molten Cu with the spherical form protrudes and solidifies. The sphericity of such a Cu ball 20 is low. It is conceivable that the impurity elements may be Sn, Sb, Bi, Zn, As, Ag, Cd, Ni, Pb, Au, P, S, U, Th, etc.

Although a lower limit value of the purity is not limited: It is preferably equal to or higher than 99.9% from the viewpoints such that the alpha dose is suppressed and the degradation of the electrical conductivity and thermal conductivity of the Cu ball 20 based on the reduced purity is suppressed.

Here, in the Cu ball 20, its alpha dose can be reduced without increasing its purity beyond necessity. The melting point of Cu is higher than that of Sn and the heating temperature of Cu is higher than that of Sn during the manufacturing. In the present invention, since a heating treatment, which has not been conventionally performed on the Cu material, is performed for manufacturing the Cu ball 20, as will become apparent below, radioactive elements such as $^{210}$Po, $^{210}$Pb, $^{210}$Bi, etc. volatilize. $^{210}$Po is especially easy to volatilize among these radioactive elements.

<Alpha Dose: Equal to or Less than 0.0200 Cph/Cm$^2$>

The alpha dose of the Cu ball 20 constituting the present invention is equal to or less than 0.0200 cph/cm$^2$. This is alpha dose such that it is insignificant for any soft errors in the high-density mounting of the electronic components. In the present invention, a reheating treatment is performed in addition to usual steps for manufacturing the Cu ball 20. Thus, a slight amount of $^{210}$Po remained in Cu raw material volatilizes and in comparison with the Cu raw material, the Cu ball 20 shows further lower dose of alpha. The alpha dose is preferably equal to or less than 0.0020 cph/cm$^2$, and more preferably equal to or less than 0.0010 cph/cm$^2$ from the viewpoints of suppressing the soft error in the further high-density mounting of the electronic components. In addition, the alpha dose of the Cu ball 20 does not rise by setting up the annealing treatment that lessens the Vickers hardness of the Cu ball 20, or the slow-cooling process.

<Total Content of at Least One of Pb and Bi that is Equal to or More than 1 Ppm>

The Cu ball 20 constituting the present invention contains Sn, Sb, Bi, Zn, As, Ag, Cd, Ni, Pb, Au, P, S, U, Th, etc. as impurity elements, however, especially the total content of either Pb or Bi, otherwise the total content of Pb and Bi is preferably equal to or more than 1 ppm. In the present invention, even in a case that the Cu ball 20 is exposed when forming a solder joint, it is unnecessary that a content of at least one of Pb and Bi contained in the Cu ball 20 is reduced to the utmost limit in reducing the alpha dose. This is because of the following reasons.

$^{210}$Pb and $^{210}$Bi change to $^{210}$PO through beta decay. It is preferable that the content of Pb and Bi as the impurity elements is as small as possible in order to reduce the alpha dose.

However, the content ratio of $^{210}$Pb and $^{210}$Bi contained in Pb and Bi is low. It is conceivable that each of $^{210}$Bp and $^{210}$Bi is almost removed if the content of Pb and Bi is reduced to some extent. The Cu ball 20 according to the present invention is manufactured by either setting a melting temperature of Cu slightly higher than heretofore, or conducting a heating treatment on the Cu material and/or the sphered Cu ball 20. In this temperature, vaporization occurs even when the temperature is lower than the boiling point of Pb or Bi, and therefore the amount of the impurity elements is decreased. Moreover, it is better to increase the content of the impurity elements in order to improve the sphericity of the Cu ball 20. Therefore, for the Cu ball 20 according to the present invention, the total content of at least one of Pb and Bi is equal to or more than 1 ppm. In a case of containing both Pb and Bi, the total content of Pb and Bi is equal to or more than 1 ppm.

Thus, a certain amount of at least one of Pb and Bi remains even after manufacturing the Cu ball 20, and therefore, the measurement error for the content rarely occurs. Furthermore, as mentioned above, Bi and Pb become the crystal cores at the time of melting in the manufacturing step of the Cu ball 20, and therefore, it is possible to manufacture the Cu ball 20 having the high sphericity if a fixed amount of either Bi or Pb is contained in Cu. Accordingly, Pb and Bi are important elements in order to estimate the content of the impurity elements. From this perspective, a total content of at least one of Pb or Bi is preferably equal to or more than 1 ppm. The total content of at least one of Pb and Bi is more preferably equal to or more than 10 ppm. Although an upper limit value is not limited: In terms of suppressing the degradation of the electrical conductivity of the Cu ball 20, the total content of at least one of Pb and Bi is more preferably less than 1000 ppm, and far more preferably 100 ppm or less. The content of Pb is more preferably 10 ppm-50 ppm, and the content of Bi is more preferably 10 ppm-50 ppm.

<Sphericity of Cu Ball: Equal to or Higher than 0.95>

For the Cu ball 20 constituting the present invention, the sphericity is equal to or higher than 0.95, in terms of maintaining an appropriate space between the substrates. If the sphericity of the Cu ball 20 is less than 0.95, the Cu ball 20 becomes an indeterminate shape. Therefore, bumps having uneven heights are formed at the bump formation time and the possibility that poor joints occur is increased. Moreover, when the Cu ball 20 is mounted on an electrode and a reflow treatment is performed thereon, there may be a position gap of the Cu ball 20 and a self-alignment property becomes worse. The sphericity is more preferably equal to or higher than 0.99. In the present invention, the sphericity represents a gap from a true sphere. The sphericity can be determined by various kinds of methods, for example, a least squares center method (LSC method), a minimum zone center method (MZC method), a maximum inscribed center method (MIC method), a minimum circumscribed center method (MCC method), etc. For details, the sphericity is an arithmetic mean value calculated by dividing a diameter of each of 500 Cu balls by a length of the longest axis of each Cu ball. It is shown that when a value thereof is closer to the upper limit 1.00, this is closer to the true sphere. In this invention, the length of the diameter and the length of the longest axis is referred to as lengths measured by measuring equipment, ultra-quick vision, ULTRA QV 350-PRO manufactured by Mitsutoyo Corporation.

<Diameter of Cu Ball: 1-1000 µm>

A diameter of the Cu ball 20 constituting the present invention is preferably 1-1000 µm. If the diameter is within this range, the spherical Cu ball 20 can be stably manufactured. Moreover, a shorted connection can be suppressed when a pitch between the terminals is narrow. In a case that the Cu ball 20 is used for solder paste, the diameter of the Cu ball 20 is preferably 1-300 µm.

Here, for example, if the diameter of the Cu ball 20 according to the present invention is 1-300 µm, a collection of 'Cu balls' can be called as 'Cu powder'. The 'Cu powder' is the collection of many Cu balls 20 having the property as mentioned above. It is distinguished from a single Cu ball 20 in usage form, such as it is mixed as the powder in solder paste, for example. Similarly, in a case that it is used for forming a solder bump, it is usually treated as a collection, and therefore the 'Cu powder' used in such a form is distinguished from the single Cu ball 20.

Moreover, a Cu core ball including the Cu ball 20 and a metal layer can be configured by coating a surface of the Cu ball 20 with the metal layer composed of a single metal or an alloy. For example, the Cu core ball can be configured to be the Cu ball 20 and a solder layer (the metal layer) coating the surface of the Cu ball 20. In case of the alloy, a composition of the solder layer is not specifically limited, if it is an alloy composition of the solder alloy whose main component is Sn. Additionally, the solder layer may be a Sn plating film. For example, Sn, Sn—Ag alloy, Sn—Cu alloy, Sn—Ag—Cu alloy, Sn—In alloy and an alloy in which a predetermined alloy element is added to them are exemplified. In any cases, a content of Sn is equal to or greater than 40 mass %. Moreover, if the alpha dose is not specified, Sn—Bi alloy or Sn—Pb alloy can be also used as a solder layer. The added alloy element may be, for example, Ag, Cu, In, Ni, Co, Sb, Ge, P, Fe, etc. An alloy composition of the solder layer is preferably Sn-3Ag-0.5 Cu alloy among them, in terms of impact resistance to dropping. A thickness of the solder layer is not specifically limited: It is preferably equal to or less than 100 µm at each side thereof, which is sufficient. Generally, 20-50 µm at each side of the layer may be preferable.

At this point, by providing a Ni plating layer, a Fe plating layer, a Co plating layer or the like between the surface of the Cu ball 20 and the solder layer, it is possible to reduce Cu diffusion into the solder in its jointing to the electrode. Accordingly, a thinning of copper of the Cu ball 20 can be suppressed. The film thickness of the Ni plating layer, the Fe plating layer, the Co plating layer or the like is generally 0.1-20 µm at each side of the layer. The content of each U and Th in the solder layer is equal to or less than 5 ppb in order to make the alpha dose of the Cu core ball equal to or less than 0.0200 cph/cm$^2$. In addition, from a viewpoint of the suppression of the soft error for the current or future high-density mounting, the content of each U and Th is preferably equal to or less than 2 ppb. Furthermore, a flux layer may be coated on the surface of the Cu core ball.

The Cu core ball according to the present invention may be configured to be the Cu ball 20 and a plating layer (the metal layer) including at least one element selected from a group of Ni, Fe and Co which coats this Cu ball 20. Furthermore, a flux layer may be coated on the surface of the Cu core ball.

In addition, the surface of the Cu ball 20 according to the present invention can be coated with the flux layer. Moreover, foamed solder can be configured by dispersing the Cu balls 20 or the Cu core balls according to the present invention into the solder. Furthermore, solder paste can be also configured by containing the Cu balls 20 or the Cu core balls according to the present invention into the solder. The Cu ball 20 or the Cu core ball according to the present invention can be used for forming a solder joint connecting the electrodes.

The above-mentioned flux layer is composed of one kind or plural kinds of components, containing a compound which works as an activator to remove a metal oxide film at the time of soldering, as well as preventing an oxidation of a metal surface of the Cu ball 20, the solder layer or the like. For example, the flux layer may be configured to be a plurality of components including a compound working as an activator, a compound working as an auxiliary activator and the like.

As an activator composing the flux layer, any one of an amine, an organic acid and a halogen compound, a combination of a plurality of amines, a combination of a plurality of organic acids, a combination of a plurality of halogen compounds, a combination of a single amine, a single organic acid and a single halogen compound or a combination of plural amines, organic acids and halogen compounds is added depending on the property required in the present invention.

As an auxiliary activator composing the flux layer, any one of an ester, an amide, an amino acid, a combination of a plurality of esters, a combination of a plurality of amides, a combination of a plurality of amino acids, a combination of a single ester, a single amide and a single amino acid or a combination of plural esters, amides and amino acids is added depending on the property of an activator.

In addition, the flux layer may contain rosin or resin, in order to protect compound and the like working as the activator from the heat at the time of reflow treatment. In addition, the flux layer may contain resin to bind compound and the like working as the activator to the solder layer.

The flux layer may be composed of a single layer containing a single compound or plural compounds. In addition, the flux layer may be composed of plural layers comprising plural compounds. The components composing the flux layer adhere to the surface of the solder layer in a solid state thereof, however, the flux needs to be liquefied or gasified in a step of binding the flux to the solder layer.

Therefore, the components composing the flux layer need to be solvent-soluble for the coating with solution. However, in case of forming a salt, for example, insoluble components exist in a solvent. The insoluble elements exist in liquid flux causes so that evenly adsorption thereof becomes difficult, in the flux containing low soluble components which cause forming depositions and the like. For this reason, the liquid flux cannot be composed by being mixed with a salt-forming compound in the prior art.

Whereas, in the Cu ball 20 or the Cu core ball having the flux layer in the present invention, a flux multilayer may be formed by forming flux layers one by one and making them into a solid state thereof. Thus, even in a case that a salt-forming compound is used and the component cannot be mixed with the liquid flux, the flux layer can be formed.

By coating the surface of the Cu ball 20 or the Cu core ball with the flux layer working as the activator, it is possible to inhibit oxidation of the surface of the Cu ball 20 and the surface of the solder layer or the metal layer of the Cu core ball during storage.

Here, the color of flux is generally different from one of metal, and the color of the Cu ball 20 and the like is also different from one of the flux layer. Therefore, an absorbed amount of the flux can be confirmed with color degree such as luminance, yellow chromaticity, and red chromaticity. In addition, a coloring matter can be added into the compound composing the flux layer for the purpose of coloring.

The following will describe an example of a method of manufacturing the Cu ball 20 according to this invention. The Cu material as material is put on a plate having heat-resisting property (hereinafter, referred to as 'heat-resisting plate') such as ceramics and is heated in a furnace together with the heat-resisting plate. There are many dimples each having a hemispheric bottom in the heat-resisting plate. A diameter of the dimple and a depth thereof are suitably set according to a diameter of the Cu ball 20. For example, the diameter thereof is 0.8 mm and the depth thereof is 0.88 mm. Further, the Cu materials each having a chip shape (hereinafter, referred to as 'chip material'), which are obtained by cutting a fine wire made of Cu, are put into the dimples one by one in the heat-resisting plate. The heat-resisting plate in which the chip material have been put into each of the dimples is heated at 1100-1300 degrees C. in the furnace into which ammonia decomposition gas is filled and heating process is performed thereon during 30 through 60 minutes. In this moment, when temperature in the furnace is more than the melting point of Cu, the chip material is fused so that it becomes sphered. Thereafter, the interior of the furnace is cooled and the Cu ball 20 is formed by being cooled rapidly in each of the dimples of the heat-resisting plate.

Further, as other methods, there are an atomizing method in which the fused Cu is dropped down from an orifice pierced in a bottom of a melting pot and the droplet is rapidly cooled to a room temperature (25 degrees C., for example) to be sphered as the Cu ball 20 and a method in which thermal plasma heats cut metal of Cu at a temperature of 1000 degrees C. or more to be sphered. Each of the Cu ball 20 sphered in such a way may be reheated at about 800 through 1000 degrees C. for 30 through 60 minutes. In addition, the effect of the annealing treatment can be obtained by cooling the Cu ball 20 slowly in the reheating treatment.

For the method of manufacturing the Cu ball 20 in the present invention, the Cu material as a raw material of the Cu ball 20 may be heated at 800 through 1000 degrees C. before the Cu ball 20 is sphered.

As the Cu material that is a raw material of the Cu ball 20, for example, pellet, wire, plate material or the like can be used. The Cu material may have purity of 99.9%-99.995% from a viewpoint such that the purity in the Cu ball 20 is not too low.

In a case of using a Cu material having the further high purity, the heating treatment mentioned above is not performed and a retention temperature of the fused Cu may be lowered to approximately 1000 degrees C. as in a conventional way. Thus, the above-mentioned heating treatment may be omitted or changed according to the alpha dose or the purity in the Cu material. In addition, in a case that a Cu ball 20 having a high alpha dose or a deformed Cu ball 20 is manufactured, the Cu ball 20 is available for reuse as raw materials and furthermore the alpha dose can be decreased.

In this embodiment, an annealing treatment is performed on the sphered Cu ball 20 in order to lower the Vickers Hardness of the Cu ball 20. In the annealing treatment, the Cu ball 20 is heated at an annealing-available temperature of 700 degrees C. for the predetermined time and then the heated Cu ball 20 is slowly cooled in long hours. Accordingly, a recrystallization of the Cu ball 20 is available. A moderate crystal growth can be expedited and therefore the crystal grain of Cu can grow up greatly. In this case, generally the sphericity of Cu becomes lower. However, since the copper oxide formed on the outermost surface of the Cu ball 20 works as an impurity element having a high purity, the crystal grains on the outermost surface of the Cu ball 20 become refined and the extreme degradation of sphericity of Cu ball 20 does not occur.

EXECUTED EXAMPLES

The following will describe executed examples of the invention, but the invention is not limited thereto. In the executed examples, a Cu ball having high purity is manufactured and the Vickers hardness and the alpha dose of the manufactured Cu ball were measured.

<Manufacturing of Cu Ball>

Manufacturing conditions of the Cu ball having the high sphericity were examined. Cu pellet having purity of 99.9%, Cu wire having purity of 99.995% or less and Cu plate having purity exceeding 99.995% were prepared. They were respectively put into melting pots and then, the melting pots were then heated up to temperature of 1200 degrees C. and this heating process was performed thereon during 45 minutes. The fused Cu was dropped down from an orifice pierced in the bottom of each of the melting pots. The generated droplets were rapidly cooled to a room temperature (18 degrees C.) so as to be sphered as the Cu balls. Thus, the Cu balls each having a mean diameter of 600 μm were manufactured. Inductively-coupled Plasma Source Mass Spectrometry (ICP-MS analysis) was used for the element analysis of U and Th, and Inductively-coupled Plasma Emission Spectroanalysis (ICP-AES analysis) was used for that of the other elements. The following will describe a method of measuring the sphericity more in detail.

<Sphericity>

The sphericity was measured by CNC image measurement system. Equipment therefor was the ultra quick vision, ULTRA QV350-PRO manufactured by MITSUTOYO Corporation.

<Vickers Hardness>

The Vickers hardness of the Cu ball was measured in accordance with 'Vickers Hardness test—Test method JIS Z2244'. Equipment therefor was micro Vickers hardness testing machine, AKASHI micro hardness tester MVK-F 12001-Q manufactured by AKASHI Corporation.

<Alpha Dose>

A measurement method of the alpha dose is as follows. An alpha-ray measurement instrument of a gas-flow proportional counter was used to measure the alpha dose. A measurement sample was a 300 mm×300 mm flat shallow container with the Cu balls being bedded on a bottom thereof so as not to see the bottom. This measurement sample was put in the alpha-ray measurement instrument and was remained in an atmosphere of PR-10 gas flow for 24 hours, and then the alpha dose was measured.

In addition, the PR-10 gas (argon 90% and methane 10%) used for the measurement was one that a gas bottle filled with the PR-10 gas was kept for a period equal to or longer than three weeks. A reason why using the gas bottle kept for the period equal to or longer than three weeks is based on JESD221 of JEDEC STANDARD-Alpha Radiation Measurement in Electronic Materials determined by JEDEC (Joint Electron Device Engineering Council) so as not to produce the alpha-ray by radon in the atmospheric air that enters into the gas bottle. A table 1 shows the element analysis result, alpha dose and sphericity of each of the manufactured Cu balls.

As shown in the Table 1, both of the Cu balls using the Cu pellet having the purity of 99.9% and the Cu wire having the purity of 99.995% or less showed sphericity of 0.95 or more, however, the Vickers hardness exceeded 60 HV.

Moreover, as shown in the Table 1, regarding the Cu balls using the Cu plate having the purity exceeding 99.995% showed the Vickers hardness of 60 HV or less, but the sphericity was less than 0.95. Accordingly, it has been proved that the Cu balls shown in the Table 1 cannot meet both of the criteria of sphericity of 0.95 or more and the Vickers hardness of 60 HV or less required to the Cu ball according to the present invention.

Executed Example 1

Next, the Cu ball manufactured from the Cu pellet having the purity of 99.9% was put in a steel tray made of carbon and then the annealing treatment was performed by putting the steel tray into a continuous conveyor type electrical resistance furnace. Annealing conditions for this case are shown in Table 2. In addition, nitrogen gas atmosphere was created in the furnace in order to prevent the oxidation of Cu ball. The room temperature was set at 25 degrees C.

TABLE 2

| status | start [min] | end [min] | Temperature [° C.] |
|---|---|---|---|
| start | 0 | 0 | 25 |
| rising temperature time | 0 | 60 | 700 |
| retention time | 60 | 120 | 700 |
| cooling time | 120 | 240 | 25 |

As the annealing conditions, as shown in FIG. 2, the time period for the temperature rising from a room temperature to 700 degrees C. was set at 60 minutes, the time period for the retention time at a temperature of 700 degrees C. was set at 60 minutes, and the time period for the cooling time from 700 degrees C. to a room temperature was set at 120 minutes. Cooling the inside of the furnace was performed by the use of a cooling fan installed inside thereof. Subsequently, an acid treatment was performed by soaking the annealed Cu ball into dilute sulfuric acid. This is because an oxide film formed on the surface of the Cu ball is removed by the annealing treatment.

The Vickers hardness of each of the Cu balls thus obtained at the pre- and post-annealing treatments will be shown in the Table 3 below. Moreover, the sphericity and alpha dose of the Cu balls at the post-annealing treatment were measured respectively by the above-mentioned method. These measurement results will be also shown in the Table 3 below.

TABLE 1

| | ALLOY COMPOSITION | | | | | | | | | | | | | | | SPHERICITY | VICKERS HARDNESS (HV) | α DOSE (cph/cm$^2$) |
|---|---|---|---|---|---|---|---|---|---|---|---|---|---|---|---|---|---|---|
| | Cu | Sn | Sb | Bi | Zn | As | Ag | Cd | Ni | Pb | Au | P | S | U | Th | | | |
| Cu ball using Cu pellet having the purity of 99.9% | bal. | 84 | 21 | 32 | 3 | 49 | 20 | 7 | 4 | 16 | 4 | 200 | 18 | 1.5 | <0.5 | 0.992624 | 73.2 | <0.0010 |
| Cu ball using Cu wire having the purity of 99.995% or less | bal. | 8 | 10 | 19 | — | 24 | 13 | — | 1 | 8 | — | — | — | <0.5 | <0.5 | 0.991682 | 67.5 | <0.0010 |
| Cu ball using Cu plate having the purity exceeding 99.995% | bal. | 13 | 2 | 18 | — | 10 | — | — | 1 | 3 | — | — | — | 0.9 | <0.5 | 0.923620 | 50.2 | <0.0010 |

*U and Th are represented by ppb. Other elements are represented by ppm.

Executed Example 2

In the executed example 2, the annealing treatment was performed on the Cu ball manufactured from the Cu wire having the purity of 99.995% or less shown in the Table 1 by the same method as the executed example 1, and a removal treatment of oxide film was conducted. And then the Vickers hardness of the obtained Cu ball was measured. In addition, the sphericity and alpha dose of the Cu ball at the post-annealing treatment were measured respectively by the above-mentioned method. These measurement results will be shown in the Table 3 below.

Comparison Example 1

In the comparison example 1, the Vickers hardness of the Cu ball manufactured from the Cu pellet having the purity of 99.9% shown in the Table 1 was measured. In addition, the sphericity and alpha dose of this Cu ball were measured respectively by the above-mentioned method. These measurement results will be shown in the Table 3 below.

Comparison Example 2

In the comparison example 2, the Vickers hardness of the Cu ball manufactured from the Cu wire having the purity of 99.995% or less shown in the Table 1 was measured. In addition, the sphericity and alpha dose of this Cu ball were measured respectively by the above-mentioned method. These measurement results will be shown in the Table 3 below.

Comparison Example 3

In the comparison example 3, the Vickers hardness of the Cu ball manufactured from the Cu plate having the purity exceeding 99.995% shown in the Table 1 was measured. In addition, the sphericity and alpha dose of this Cu ball were measured respectively by the above-mentioned method. These measurement results will be shown in the Table 3 below.

the Vickers hardness is equal to or higher than 20 HV and equal to or less than 60 HV, and the sphericity is equal to or higher than 0.95, with the annealing treatment, even in a case where the Cu ball having the purity which is equal to or higher than 99.9 and equal to or lower than 99.995% is used and the Vickers hardness exceeds 60 HV at the time of sphering it. Additionally, in the executed examples 1 and 2, the alpha dose of the Cu ball is equal to or less 0.0010 cph/cm$^2$ at the pre- and post-annealing treatment, as shown in the Table 3, and it has been proved that the low alpha dose can be also obtained after the annealing treatment.

Whereas, for the Cu balls in the comparison examples 1 and 2, as shown in the Table 3, its sphericity is equal to or higher than 0.95, but the Vickers hardness exceeds 60 HV. Therefore, it has been proved that they do not meet the requirements of both the Vickers hardness and sphericity of Cu ball according to the present invention. Moreover, for the Cu ball in the comparison example 3, the Vickers hardness is equal to or less than 60 HV, but the sphericity is less than 0.95. Therefore, it has been proved that such a Cu ball does not meet the requirements of both the Vickers hardness and sphericity of Cu ball according to the present invention.

Executed Example 3

The sphericity and alpha dose of the Cu core ball by using the above-mentioned Cu ball will be described at the pre- and post-annealing treatments. In the executed example 3, the sphericity and alpha dose of the Cu core ball were measured by the above-mentioned method. The Cu core ball had been manufactured by coating 2 μm-thick Ni plating layer at each side on the surface of the Cu ball after the annealing treatment in the executed example 1. These measurement results will be shown in the Table 4 below.

Executed Example 4

In the executed example 4, the sphericity and alpha dose of the Cu core ball were measured by the above-mentioned

TABLE 3

| | PURITY | VICKERS HARDNESS (HV) | SPHERICITY | α DOSE (cph/cm$^2$) | REMARKS |
|---|---|---|---|---|---|
| EXECUTED EXAMPLE 1 | 99.90% | 57.9 | 0.987523 | <0.0010 | Post-annealing treatment |
| EXECUTED EXAMPLE 2 | 99.995% or less | 55.8 | 0.984764 | <0.0010 | Post-annealing treatment |
| COMPARISON EXAMPLE 1 | 99.90% | 73.2 | 0.992624 | <0.0010 | Pre-annealing treatment |
| COMPARISON EXAMPLE 2 | 99.995% or less | 67.5 | 0.991682 | <0.0010 | Pre-annealing treatment |
| COMPARISON EXAMPLE 3 | exceeding 99.995% | 50.2 | 0.923620 | <0.0010 | Pre-annealing treatment |

The Vickers hardness of each of the Cu balls in the executed examples 1 and 2 was equal to or higher than 20 HV and equal to or less than 60 HV by the annealing treatment as shown in the Table 3. In addition, the sphericity of the Cu ball was still kept to be equal to or higher than 0.95 after the annealing treatment. It was expected that the grain growth occurred by the annealing treatment and therefore the sphericity was deteriorated. However, the result was that unexpectedly high sphericity was maintained, according to the executed examples.

As the reason for this, it is conceivable that a lot of impurity elements are contained, or the copper oxide works as an impurity element at the periphery of the oxide film on the surface of Cu ball so that the degradation of sphericity is inhibited by locally impeding the grain growth at the vicinity of the surface of Cu ball, and the like. Consequently it has been proved that the Cu ball can be obtained of which method. The Cu core ball had been manufactured by coating 2 μm-thick Ni plating layer at each side on the surface of the Cu ball, after the annealing treatment in the executed example 2. These measurement results will be shown in the Table 4 below.

Executed Example 5

In the executed example 5, the sphericity and alpha dose of the Cu core ball were measured by the above-mentioned method. The Cu core ball had been manufactured by coating 50 μm-thick solder plating layer of Sn-3Ag-0.5Cu alloy at each side on the surface of the Cu ball, after the annealing treatment in the executed example 1. These measurement results will be shown in the Table 4 below.

Executed Example 6

In the executed example 6, the sphericity and alpha dose of the Cu core ball were measured by the above-mentioned method. The Cu core ball had been manufactured by coating 50 μm-thick solder plating layer of Sn-3Ag-0.5Cu alloy at each side on the surface of the Cu ball, after the annealing treatment in the executed example 2. These measurement results will be shown in the Table 4 below.

Executed Example 7

In the executed example 7, the sphericity and alpha dose of the Cu core ball were measured by the above-mentioned method. The Cu core ball had been manufactured by further coating the solder plating layer on the surface of the Cu core ball coated with Ni plating in the executed example 3. In the executed example 7, the Cu ball whose diameter is 600 μm, is coated with 2 μm-thick Ni plating layer and 50 μm-thick solder plating layer thereon at each side of the layers, so that a Cu core ball having a diameter of 704 μm is made. These measurement results will be shown in the Table 4 below.

Executed Example 8

In the executed example 8, the sphericity and alpha dose of the Cu core ball were measured by the above-mentioned method. The Cu core ball had been manufactured by further coating the solder plating layer on the surface of the Cu core ball coated with Ni plating in the executed example 4. These measurement results will be shown in the Table 4 below.

Comparison Example 4

In the comparison example 4, the sphericity and alpha dose of the Cu core ball were measured by the above-mentioned method. The Cu core ball had been manufactured by coating 2 μm-thick Ni plating layer at each side on the surface of the Cu ball in the comparison example 3. These measurement results will be shown in the Table 4 below.

Comparison Example 5

In the comparison example 5, the sphericity and alpha dose of the Cu core ball were measured by the above-mentioned method. The Cu core ball had been manufactured by coating 50 μm-thick solder plating layer of Sn-3Ag-0.5Cu alloy at each side on the surface of the Cu ball in the comparison example 3. These measurement results will be shown in the Table 4 below.

Comparison Example 6

In the comparison example 6, the sphericity and alpha dose of the Cu core ball were measured by the above-mentioned method. The Cu core ball had been manufactured by sequentially coating Ni plating layer and then solder plating layer on the surface of the Cu ball in the comparison example 3. These measurement results will be shown in the Table 4 below.

TABLE 4

| | PLATING | PURITY OF Cu BALL | SPHERICITY | α DOSE (cph/cm$^2$) | REMARKS |
|---|---|---|---|---|---|
| EXECUTED EXAMPLE 3 | Ni PLATING | 99.90% | 0.987489 | <0.0010 | Post-annealing treatment |
| EXECUTED EXAMPLE 4 | Ni PLATING | 99.995% or less | 0.984959 | <0.0010 | Post-annealing treatment |
| EXECUTED EXAMPLE 5 | SOLDER PLATING | 99.90% | 0.989101 | <0.0010 | Post-annealing treatment |
| EXECUTED EXAMPLE 6 | SOLDER PLATING | 99.995% or less | 0.986139 | <0.0010 | Post-annealing treatment |
| EXECUTED EXAMPLE 7 | SOLDER PLATING ON Ni PLATING | 99.90% | 0.989312 | <0.0010 | Post-annealing treatment |
| EXECUTED EXAMPLE 8 | SOLDER PLATING ON Ni PLATING | 99.995% or less | 0.989129 | <0.0010 | Post-annealing treatment |
| COMPARISON EXAMPLE 4 | Ni PLATING | exceeding 99.995% | 0.925112 | <0.0010 | Pre-annealing treatment |
| COMPARISON EXAMPLE 5 | SOLDER PLATING | exceeding 99.995% | 0.930974 | <0.0010 | Pre-annealing treatment |
| COMPARISON EXAMPLE 6 | SOLDER PLATING ON Ni PLATING | exceeding 99.995% | 0.930998 | <0.0010 | Pre-annealing treatment |

For the Cu core balls according to the executed examples 3 through 8, the sphericity was equal to or higher than 0.95 in each executed example as shown in the Table 4, and it has been proved that a high sphericity can be obtained even in a case that the Cu ball is coated with Ni plating layer, a solder plating layer, or the piled layers thereof. Similarly, for the Cu core balls according to the executed examples 3 through 8, the alpha dose was equal to or less than 0.0010 cph/cm$^2$ in each executed example, and it has been proved that low alpha dose can be kept even in a case that the Cu ball is coated with Ni plating layer, a solder plating layer, or the piled layers thereof.

Whereas, for the comparison examples 4 through 6, the alpha dose was equal to or less than 0.0010 cph/cm$^2$ in each comparison example, which meets the requirement of the alpha dose of the Cu core ball according to the present invention. However, the sphericity was less than 0.95 and it has been proved that they do not meet the requirement of the sphericity of the Cu core ball according to the present invention.

Next, a flux-coated Cu ball was manufactured by the use of the Cu ball in the executed example 1 where desired sphericity and alpha dose had been obtained, and then an oxide film thickness was measured.

(1) Composition of Flux

Flux was manufactured with the composition shown in Table 5 below. Flux (9) contains stearic acid (in organic acid) of 5 mass % as an activator and rosin ester of 5 mass % as rosin. Since the flux needs to be liquefied before being applied, the Flux (9) contains isopropyl alcohol of 90 mass % as a solvent for the balance of composition ingredient.

Flux (10) contains 2-phenylimidazole (in amines) of 5 mass % as an activator, hydrogenated rosin of 5 mass % as rosin, and isopropyl alcohol of 90 mass % as a solvent for the balance of composition ingredient.

TABLE 5

|  | FLUX (9) | FLUX (10) |
| --- | --- | --- |
| Rosin ester | 5% | — |
| Hydrogenated rosin | — | 5% |
| 2-Phenylimidazole | — | 5% |
| Stearic acid | 5% | — |
| Isopropyl alcohol | 90% | 90% |

(2) Manufacture of Flux-Coated Cu Ball

Flux-coated Cu balls in the executed examples shown hereinafter were manufactured by using the Cu ball in the executed example 1 where desired sphericity and alpha dose had been obtained, and the flux shown in the Table 5. For a flux-coated Cu ball in an executed example 9, the Cu balls were soaked in the Flux (9) shown in the Table 5, and then were sprayed into a steel tray and a hot air drying was conducted on it.

For flux-coated Cu balls in the executed example 10, the Cu balls in the executed example 1 were soaked in the Flux (10) shown in the Table 5, and then were sprayed into a steel tray and a hot air drying was conducted on it. In a comparison example 7, the Cu ball in the executed example 1 was used without being flux-coated.

(3) Measurement of Oxide Film Thickness

A heating treatment was performed on the flux-coated Cu ball coated with the flux in each executed example, and Cu ball without being coated with flux, respectively in a thermostatic chamber. The treatment lasted for one minute at temperature of 200 degree C.

The obtained flux-coated Cu ball was cleaned with isopropyl alcohol to produce a Cu ball to which flux was not adhered. For the Cu balls which the flux was removed from the flux-coated Cu balls in the respective executed examples, and the Cu ball which was not coated with flux in the comparison example 7, the oxide film thickness of each Cu ball was measured by FE-AES. Each of the oxide film thickness was represented in $SiO_2$ conversion value. Each of the oxide film thickness is shown in the Table 6.

TABLE 6

| EXECUTED EXAMPLE (9) | EXECUTED EXAMPLE (10) | COMPARISON EXAMPLE (7) |
| --- | --- | --- |
| 1.45 nm | 1.82 nm | 3.75 nm |

As shown in the Table 6, the flux-coated Cu balls in the executed examples 9 and 10, where each of the Cu balls is coated with the flux containing a combination of organic acid and rosin, or a combination of amine and rosin were compared with the Cu ball non-coated with the flux in the comparison example 7. It has been proved that an oxidation can be inhibited under a high temperature environment, due to the improvement of heat resistance.

<Solderability of Flux-Coated Cu Core Ball>

The flux-coated Cu core ball was manufactured by using the Cu core ball in the executed example 5 where desired sphericity and alpha dose had been obtained, and then its solderability was examined.

(1) Composition of Flux

Species of flux were manufactured with the composition shown in the Table 7 below. Flux (11) contains stearic acid (in organic acid) of 5 mass % as an activator and rosin ester of 5 mass % as rosin and isopropyl alcohol of 90 mass % as a solvent for the balance of composition ingredient.

Flux (12) contains 2-phenylimidazole (in amines) of 5 mass % as an activator, hydrogenated rosin of 5 mass % as rosin, and isopropyl alcohol of 90 mass % as a solvent for the balance of composition ingredient.

Flux (13) contains sebacic acid (in organic acid) of 10 mass % as an activator, and isopropyl alcohol of 90 mass % as a solvent for the balance of composition ingredient. Flux (14) contains trans-2,3-dibromo-2-butene-1,4-diol (a kind of dibromo-butene-diol in halogen compound elements) of 10 mass % as an activator, and isopropyl alcohol of 90 mass % as a solvent for the balance of composition ingredient.

TABLE 7

|  | FLUX (11) | FLUX (12) | FLUX (13) | FLUX (14) |
| --- | --- | --- | --- | --- |
| Rosin ester | 5% | — | — | — |
| Hydrogenated rosin | — | 5% | — | — |
| 2-Phenylimidazole | — | 5% | — | — |
| Sebacic acid | — | — | 10% | — |
| Stearic acid | 5% | — | — | — |
| Trans-2,3-dibromo-2-butene-1,4-diol | — | — | — | 10% |
| Isopropyl alcohol | 90% | 90% | 90% | 90% |

(2) Manufacture of Flux-Coated Cu Core Ball

Next, flux-coated Cu core balls in the following executed examples were manufactured by using the Cu core ball in the executed example 5 where desired sphericity and alpha dose had been obtained, and the flux shown in the Table 7 mentioned above. For a flux-coated Cu core ball in an executed example 11, the Cu core balls in the executed example 5 were soaked in Flux (11) shown in the Table 7, and then were sprayed into a steel tray and a hot air drying was conducted on it.

For a flux-coated Cu core ball in an executed example 12, the Cu core balls in the executed example 5 were soaked in Flux (12) shown in the Table 7, and then were sprayed into a steel tray and a hot air drying was conducted on it. For a flux-coated Cu core ball in an executed example 13, the Cu core balls in the executed example 5 were soaked in Flux (13) shown in the Table 7, and then were sprayed into a steel tray and a hot air drying was conducted on it. For a flux-coated Cu core ball in Executed example 14, the Cu core balls in the executed example 5 were soaked in Flux (14) shown in the Table 7, and then were sprayed into a steel tray and a hot air drying was conducted on it. In a comparison example 8, the Cu core ball in the executed example 5 was used without being coated with the flux.

(3) Verification of Solderability

The flux-coated Cu core balls in the respective executed examples and the Cu core balls without flux being coated were respectively sprayed into a Cu plate, and then an air reflow treatment was conducted on them on a hot plate at the temperature of 250 degrees C. for 30 seconds.

It was verified whether or not the solderability was formed in joint objects obtained on the Cu plate. A verification of the solderability was performed such that the Cu plate on which the flux-coated Cu core ball in each of the executed examples and the Cu core balls in the comparison examples were reflowed was allocated vertically on a desk and then the plate was dropped to the desk from the height of approximately 5 cm.

Under this circumstance, in case where the joint object remains joined to the Cu plate, 'YES' is determined, whereas in case where the joint object comes off the Cu plate, 'NO' is determined. Additionally, the solderability can be also verified by examining if the joint object comes off or not by rubbing the joint object with fingers, or rubbing it during the cleaning of the Cu plate with IPA (Isopropyl alcohol), or just being cleaned. Here, a pre-flux treatment called OSP (Organic Solderability Preservative) may be conducted on the Cu substrate as a joint target for the verification. In the present example, a Cu-OSP substrate was used.

The solderability was also verified with a Ni plated Cu substrate as the joint target. The method of producing the sample is the same as that of the verification example used with the Cu substrate, except for using the Ni plated Cu substrate, and the determination criteria thereof are also the same as those of the Cu plate. The verification results of the solderability with the use of the Cu plate and the Ni plated Cu plate will be shown in the Table 8 below.

TABLE 8

|  | EXECUTED EXAMPLE (11) | EXECUTED EXAMPLE (12) | EXECUTED EXAMPLE (13) | EXECUTED EXAMPLE (14) | COMPARISON EXAMPLE (8) |
| --- | --- | --- | --- | --- | --- |
| Cu-OSP SUBSTRATE | YES | YES | YES | YES | NO |
| Ni PLATING Cu SUBSTRATE | YES | YES | YES | YES | NO |

As shown in the Table 8, for the flux-coated Cu core balls in the executed examples 11, 12, 13 and 14, the joint object obtained from the reflow treatment did not come off the joint target even when the joint target is a Cu-OSP substrate or a Ni plated Cu substrate. This is because it is conceivable that the oxide film could be removed by the flux, and therefore an alloy layer or so-called, a solder-bonding could be formed.

Whereas, the joint object obtained from the reflow treatment came off from the joint target, for the Cu core ball without flux being coated in the comparison example 8. This is because it is conceivable that the oxide film could not be removed, and therefore the solder-bonding could not be done. Accordingly, it is understood that the solderability has improved more in the flux-coated Cu core ball, compared to the Cu core ball.

In addition, for the manufactured flux-coated Cu balls and Cu core balls, a separation process is conducted with a sieving or the like and therefore the flux-coated Cu balls and Cu core balls can be selected on every an amount of coated flux. Thereby, both of the wettability of the solder paste used for bonding with an electrode and the fluidity of the flux-coated ball can be obtained for the Cu ball. Both of the wettability of solder toward the electrode and the fluidity of the flux-coated ball can be obtained for the Cu core ball.

Furthermore, in all the executed examples of the flux-coated ball of the present invention, the alpha dose was measured and the alpha dose to be radiated in all the executed examples was equal to or less than 0.0010 cph/cm$^2$, which meets a requirement, in which the alpha dose of the Cu ball constituting the present invention is equal to or less than a value, 0.0200 cph/cm$^2$ that is preferable for inhibiting a soft error.

In addition, technical scope of the present invention is applicable for a Cu column, a pillar and a pellet which hold the above-mentioned characteristics of the present invention.

DESCRIPTION OF CODES

10 Semiconductor Chip
11, 41 Electrode
12, 42 Solder Paste
20 Cu Ball
30 Solder Bump
40 Printed Circuit Board
50 Solder Joint
60 Electronic Components

The invention claimed is:
1. A Cu ball containing:
purity which is equal to or higher than 99.9% and equal to or lower than 99.995%,
sphericity which is equal to or higher than 0.95, and
Vickers hardness which is equal to or higher than 20 HV and equal to or less than 60 HV,
wherein a content of U is equal to or less than 5 ppb, a content of Th is equal to or less than 5 ppb, a content of at least one of Pb and Bi is more than 1 ppm, and an alpha dose is equal to or less than 0.0200 cph/cm$^2$.
2. The Cu ball according to claim 1, wherein a diameter thereof is 1-1000 μm.
3. The Cu ball according to claim 1 wherein the Cu ball is coated with a flux layer.
4. The Cu ball according to claim 1, wherein the content of at least one of Pb and Bi is equal to or more than 10 ppm.
5. A solder joint using the Cu ball according to claim 1.
6. Solder paste using the Cu ball according to claim 1.
7. Foamed solder using the Cu ball according to claim 1.
8. A Cu core ball containing:
the Cu ball according to claim 1; and
a solder layer coating the Cu ball.
9. The Cu core ball according to claim 8 wherein sphericity thereof is equal to or higher than 0.95.
10. The Cu core ball according to claim 8 wherein the Cu core ball is coated with a flux layer.
11. A solder joint using the Cu core ball according to claim 8.
12. Solder paste using the Cu core ball according to claim 8.
13. Foamed solder using the Cu core ball according to claim 8.
14. A Cu core ball containing:
the Cu ball according to claim 1; and
a plating layer which includes at least one element selected from a group of Ni, Fe and Co, the plating layer coating the Cu ball.
15. The Cu core ball according to claim 14, further comprising:
a solder layer which coats the plating layer.
16. The Cu core ball according to claim 15, wherein in the solder layer coating the plating layer,
an alpha dose is equal to or less than 0.0200 cph/cm$^2$.

* * * * *